United States Patent [19]

Yamaguchi

[11] Patent Number: 4,807,828

[45] Date of Patent: Feb. 28, 1989

[54] FISHING REEL

[75] Inventor: Nobuyuki Yamaguchi, Tokyo, Japan

[73] Assignee: Daiwa Seiko Co., Ltd., Tokyo, Japan

[21] Appl. No.: 59,164

[22] Filed: Jun. 8, 1987

Related U.S. Application Data

[63] Continuation of Ser. No. 754,232, Jul. 12, 1985, abandoned.

[30] Foreign Application Priority Data

Jul. 14, 1984 [JP] Japan .......................... 59-106753[U]
Jul. 14, 1984 [JP] Japan .......................... 59-106752[U]

[51] Int. Cl.$^4$ .......................................... A01K 89/015
[52] U.S. Cl. ............................................. 242/84.52 B
[58] Field of Search ................... 242/84.52 B, 84.53; 310/93, 105

[56] References Cited

U.S. PATENT DOCUMENTS

| | | | |
|---|---|---|---|
| 2,535,584 | 12/1950 | Lorenz | 242/84.53 |
| 2,550,861 | 5/1951 | Ransom | 242/84.52 B |
| 3,246,859 | 4/1966 | Martin | 242/221 |
| 4,549,703 | 10/1985 | Atobe | 242/84.52 B |

FOREIGN PATENT DOCUMENTS

| | | | |
|---|---|---|---|
| 58-13075 | 4/1983 | Japan | 242/84.52 B |
| 58-117866 | 8/1983 | Japan | 242/84.52 B |
| 58-122965 | 8/1983 | Japan | 242/84.52 B |
| 58-137076 | 9/1983 | Japan | 242/84.52 B |
| 155036 | 9/1983 | Japan . | |
| 635116 | 4/1950 | United Kingdom | 242/84.52 B |

Primary Examiner—Stuart S. Levy
Assistant Examiner—Katherine Matecki
Attorney, Agent, or Firm—Cushman, Darby & Cushman

[57] ABSTRACT

Herein disclosed is a fishing reel comprising a spool rotatably mounted on a reel frame, a non-magnetic conductor in a cover member of the reel frame and fixed to the spool, and a brake mechanism for producing an eddy current in the non-magnetic conductor to dampen the rotation of the spool. An adjuster is movably provided in the cover member for adjusting a dampening force of the spool when a fishing line is paid out from the spool. A dampening force adjusting dial for actuating the adjuster is mounted a rear upper portion of the cover member so that the operator's thumb is readily accessible to the adjusting dial. The fishing reel may comprise an indicating device for indicating the dampening force applied to the spool.

2 Claims, 5 Drawing Sheets

FISHING REEL

This is a continuation of application Ser. No. 754,232, filed July 12, 1985 which was abandoned upon the filing hereof.

BACKGROUND OF THE INVENTION

This invention relates to a fishing reel, and more particularly, to an improvement in an indicia means for indicating a backlash or spool-overrun preventing or damping force and an adjusting means per se for such a force, wherein a spool is so controlled as to rotate at a speed lower than that required for paying out a fishing line when cast, thereby adjusting the spool to obtain a moderate speed.

Fishing reels such as a casting reel and the like are adapted so that a fishing line wound around a spool is successively paid out when a lure and a weight are cast to the point, that is, in casting simultaneously with freely rotating the spool. At this moment, the spool is so controlled as to rotate at a speed not higher than that required for paying out the fishing line, to prevent the fishing line from involving backlash. There have been provided backlash preventing means of a mechanical brake type and magnetic type. In the mechanical brake type, a brake shoe is rotated together with a spool while the former is being forced against a brake plate. In the magnetic type, magnets are mounted in a stationary manner and a non-magnetic conductor is fixed to the spool, with the rotatable non-magnetic conductor being interposed between N and S poles of the magnets to produce an eddy current, thereby damping the spool. A magnet damping system has been known in Japanese Utility Model application Laid-Open Nos. 13075/83 and 117866/83 and Japanese patent application Laid-Open No. 155036/83.

A damping or braking force required for eliminating backlash of the fishing line is not constant. In order to sufficiently eliminate or minimize backlash of the fishing line, a damping force acting on the spool must be adjusted in response to an inertia torque of the spool rotating depending upon a speed at which the fishing line is paid out in casting.

As seen from Japanese Utility Model application Laid-Open No. 117866/83, a spool damping force control means of this class is designed so that a knob is rotatably mounted on an outer periphery of a reel flange and that the knob stem is connected through a suitable gear train to a magnet which is rotatable around the non-magnetic conductor by rotatably operating the knob to change circumferential relative positions of the magnets. The non-magnetic conductor is adapted to thus adjust the damping force exerted on the spool. An outer periphery of the reel flange is provided with scale corresponding to the position of the knob so that the extent of the damping force on the spool may be visually indicated.

However, according to such a conventional manner that the damping force is indicated, although the knob is operated to set an indicating mark to the indicia scale for adjustment of the spool damping force, the knob is made tiny and almost covered with the operator's finger tips when used, to thus involve difficulty in making sure a position where the scale is pointed out. Further, the indicia scale is positioned around the knob and formed on the outer periphery of the reel flange, and the knob in turn extends from the reel flange. Disadvantages derived therefrom are that the scale would be included in a shadow of the knob to cause the scale to be unable to be read out unless one should look into the scale, and that the scale around the knob to be pointed out is unable to be read out at once, especially is this the case with a blur of the scale due to a change in a lapse of time.

Also, the conventional backlash preventing means is disadvantageous in its operability. For example, in Japanese patent application Laid-Open No. 155036/83, there is a backlash preventing means in which a lever provided on an outer face of a reel is used to adjust a braking force. In such a fishing reel, it is general that a lever for adjustment of the braking force is provided on a reel side for readily operating the reel by gripping the fishing rod and the fishing reel. For this reason, it would be impossible to operate the lever by the operator's hand on the lever side of the reel. Even if the thumb of the operator's hand on the lever side of the reel might actuate the lever for the brake adjustment, the position of a tip end of the adjustment lever which is manually actuated by the operator's thumb would be varied up and down. Therefore, it would be difficult to manually actuate the adjustment lever by the lever side thumb of the operator's hand which is gripping the fishing rod thus the operator's thumb will be tired. This results in adverse effect on the subsequent casting. Also, even if the adjustment lever would be actuated by the thumb downwardly, it would be difficult to actuate the lever upwardly to a desired position by the thumb. Furthermore, in the conventional brake adjustment lever remarkably projects to the outside from the fishing reel, which lever obstruct the manual operation of the fishing reel.

SUMMARY OF THE INVENTION

Accordingly, an object of the invention is to overcome the above-noted defects inherent in the prior art.

Another object of the invention is to provide a fishing reel which is capable of readily setting a brake force against a spool by the operator's thumb without any fatigue being caused in the thumb.

Another object of the invention is to provide a fishing reel in which its operating portion of the setting means does not obstruct the manual operation of the fishing reel.

Still another object of the invention is to provide a fishing reel which is capable of immediately reading out a clear indication of the spool damping force required for eliminating backlash of the fishing line with high accuracy at any time.

These and other objects of the invention are attained by a fishing reel comprising a reel frame having a pair of cover members, a spool rotatably mounted on the reel frame, a brake mechanism for braking a rotation of said spool when the spool is freely rotatable, the brake mechanism including magnetic means for producing magnetic fields and a non-magnetic conductor made of non-magnetic but electrically conductive material, the non-magnetic conductor being fixed to the spool and being disposed in the magnetic field of the magnetic means, adjusting means movably provided in one of the pair of cover members for adjusting a damping force for the rotation of the spool, and actuator means for actuating the adjusting means, the actuator means being located on a rear side of the one of the pair of cover members, wherein the actuator means includes a rotatable dial a part of which is exposed outwardly and the part of said dial is manually operable by a thumb of an operator's hand which is gripping a fishing rod, the fishing reel further comprising indicating means for indicating the dampening force applied to the spool, the indicating means being spaced away from the dial.

DETAILED DESCRIPTION OF THE PREFERRED EMBODIMENTS

Figure 1:
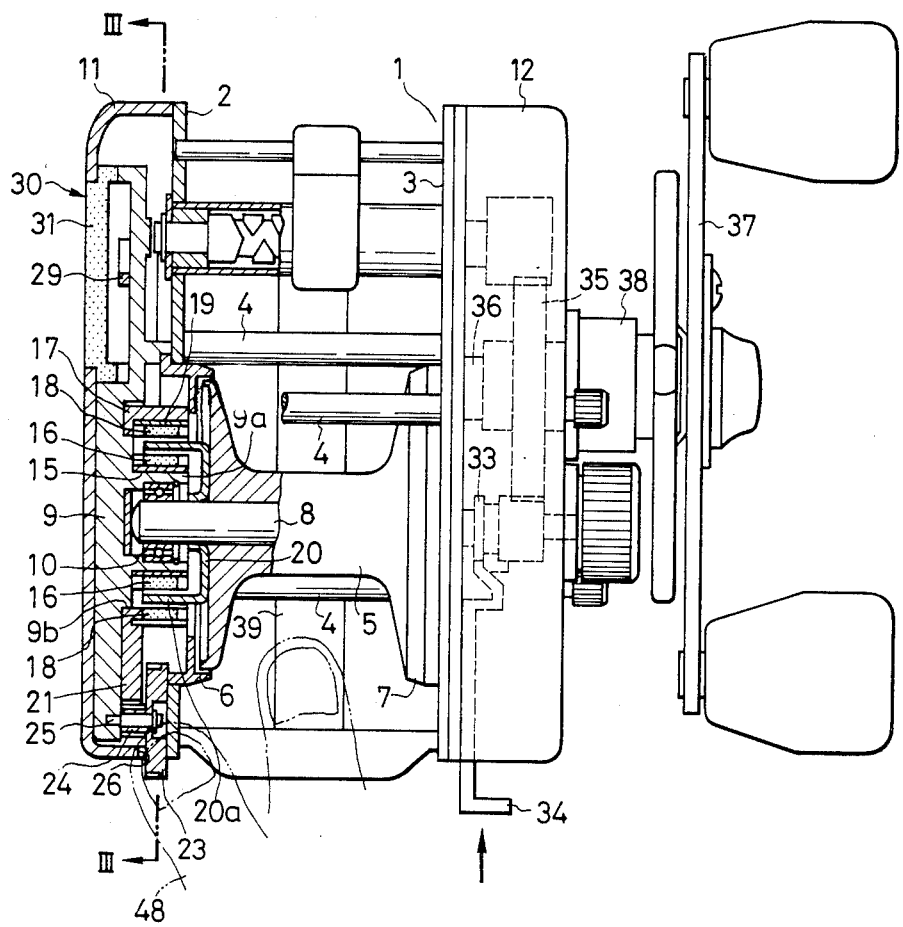
FIG. 1 is a plan view showing one form of a fishing reel embodying the present invention with parts being broken away.

An embodiment of the present invention will be described in conjunction with the drawings.

FIGS. 1 to 5 show examples of a fishing reel with an indicia means for a backlash eliminating damping force in which the present invention is embodied. A frame, generally designated by reference numeral 1, comprises a pair of flanges 2 and 3 disposed opposite to and spaced away from each other at a predetermined distance, and a plurality of connecting rods 4 extending between both the flanges 2 and 3 to couple one to the other as a unit. A spool 5 for winding a fishing line thereon is arranged between the flanges 2 and 3. The opposite ends of the spool 5 are covered with covers 6 and 7 secured to the flanges 2 and 3 and includes on its axis a spool shaft 8 which passes through the spool 5 and is fixed thereto. One end of the spool shaft 8 is journalled by a bearing (not shown) to the cover 7 whereas the other end of the spool shaft 8 is rotatably journalled by a bearing 10 in a boss 9a of a holder casing 9 as will be described later. Cover members 11 and 12 are attached to the flanges 2 and 3 of the reel frame 1 and are fixed by screws 13 by utilizing the connecting rods 4 of the reel frame 1.

Figure 2:
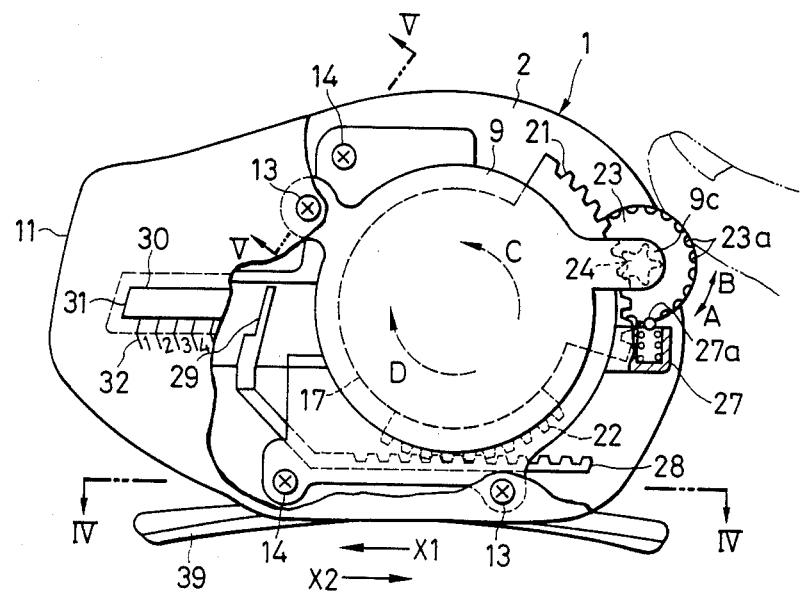
FIG. 2 is a left side view of the reel with parts of FIG. 1 being broken away.
Figure 4:
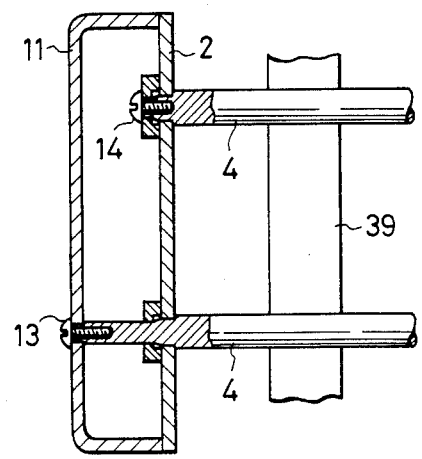
FIG. 4 is a section taken along line IV—IV of FIG. 2.
Figure 5:
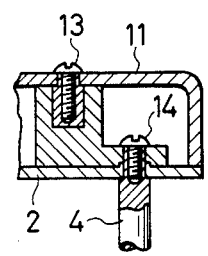
FIG. 5 is a section taken along line V—V of FIG. 2.

The holder casing 9 is received in the cover member 11 and is fixed to the connecting rods 4 coupled to the flange 2 by screws 14 as shown in FIGS. 2, 4 and 5. The holder casing 9 has the boss 9a for the bearing which serves to support one end of the spool shaft 8 as described above. A magnetic element 15 in the form of a ring is mounted peripherally of the boss 9a and carries on the outer peripheral surface thereof a plurality (for instance, six) of magnets 16 equidistantly disposed thereon. An adjuster 17 in the form of a ring is arranged coaxially with the boss 9a in confronting relation to the outer peripheral surface of the magnets 16. One end of the adjuster 17 is rotatably mounted on a ring-shaped stepped portion 9b formed in the holder casing 9 and the other end of the adjuster abuts against a flanged segment 6. A plurality (for instance, six) of magnets 18 are equidistantly mounted on the adjuster 17 on the inner peripheral surface thereof. One magnetic polarity side of each magnet 18 is carried on a magnetic element 19 in the form of a ring embedded in the adjuster 17. The surfaces of the inner and outer magnets 16 and 18 arranged in the aforementioned manner are disposed opposite to each other and are subjected to either one of the N and S poles. A cylinder 20a of a non-magnetic conductor 20 of aluminium or the like coupled to the spool 5 is coaxially positioned between the magnetic poles.

Figure 3:
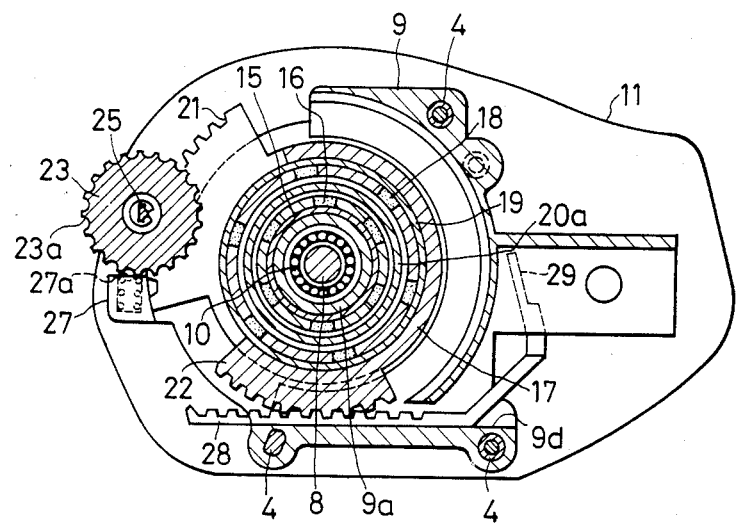
FIG. 3 is a section taken along line III—III of FIG. 1.

First and second sector gears 21 and 22 are integrally formed around the adjuster 17 to extend in the cover member 11 rearwardly and downwardly thereof as shown in FIGS. 2 and 3. The first sector gear 21 meshes with a pinion 24 formed coaxially and integrally with a control member for brake adjustment, that is, a dial 23. The dial 23 is rotatably supported to a shaft 25 which is secured perpendicular to a projection 9c horizontally extending from the holder casing 9 to the rear of the cover member 11. A portion of the dial 23 outwardly extends through an opening 26 formed in a peripheral wall of the cover member 11 rearwardly thereof The dial 23 is provided on its outer peripheral surface with serrations 23a each having a semicircular grooved form and spaced away from each other in a regular manner. A ball 27a in a click stop mechanism 27 engages with the serration 23a to provide the dial 23 with moderate rotation and causes the same to stop in a predetermined position. The click stop mechanism 27 is formed integral with the holder casing 9. Thus, the dial 23 is located where the thumb 48 of the operator's hand gripping the fishing rod is readily accessible, as shown by dot-dash lines in FIG. 1.

The second sector gear 22 is adapted to mesh with a rack 28 which is slidably mounted in a guide 9d of the holder casing 9 to move back and forth (in the direction of arrow X1 or X2 of FIG. 2) with respect to the cover member 11. One end of the rack 28 extends obliquely forwardly in the cover member 11 and is formed at its tip with an upwardly extending pointer 29. The cover member 11 is formed in a portion corresponding to the pointer 29 with a rectangular display window 30. The display window 30 is closed by a transparent member 31 of acryl or the like and is graduated to provide a scale 32 on the outer margin thereof for showing the extent of damping force.

On the other hand, the other end of the spool shaft 8 is coupled to a clutch 33 formed in the cover member 12. The clutch 33 is adapted to be disengaged by a clutch lever 34 from outside of the cover member 12 and is connected by a gear train 35 to a handle shaft 36 which includes a take-up handle 37 and a drag member 38. Numeral 39 denotes a reel foot for attaching the reel to a fishing rod (not shown).

Operation of the embodiment shown will now be explained. For casting, the clutch lever 34 is initially pushed in the direction of arrow of FIG. 1 to disengage the clutch 33, bringing the spool 5 to a free condition. Under such condition, a fishing line (not shown) flies to the point by operation of casting and is then paid out from the spool 5 to rotate the spool in the direction of the fishing line paid out. At the same time, the non-magnetic conductor 20 integrated with the spool 5 is rotated to thus cause the cylinder 29a between the inside and outside magnets 16 and 18 to pass through magnetic flux generated therebetween, thereby draining an eddy current into the interior of the cylinder 20a intersecting with the magnetic flux at a right angle. This produces damping torque between the eddy current and the magnets 16 and 18 to resist against the rotation of the non-magnetic conductor 20. This damping torque is proportional to the square of the magnetic flux. Thus, the adjuster 17 is rotatably operated in the direction of the magnets where the inside magnets 16 confronts the outside magnets 18 to attain the maximum damping force for the non-magnetic conductor 20, viz., the spool 5. On the other hand, the adjuster 17 is rotatably operated so as to position each of the outside magnets 18 between the adjacent inside magnets 16 to attain the minimum damping force of the spool 5. At this moment, the dial 23 is operated by the operator's thumb and the like to move forward or reverse in the direction of arrow A or B (FIG. 2) to adjust and control the damping force.

More specifically, the dial 23 is rotatably operated in the direction of arrow A shown in FIG. 2 to impart its rotation to the pinion 24 and the first sector gear 21 so that the adjuster 17 is rotated in the direction of arrow C of FIG. 2 and gradually moved in the direction where the outside magnets 18 are opposed to the inside magnet 16. Simultaneously therewith, the rack 28 which meshes with the second sector gear 22 is slid in the direction of arrow X2 of FIG. 2 and the pointer 29 is rotated in the same direction, accordingly. Upon viewing movement of the pointer 29 through the display window 30, it is observed that the damping force derived from operation of the dial for avoiding backlash is controlled in the direction where the former becomes greater. Thus, the extent of the damping force is known by reading one of the slide divisions 32 which the pointer 29 points out. During rotation of the dial 23, the serration 23a engages or disengages with the ball 27a in the click stop means 27 to control the rotation of the dial 23 in a moderate manner and to hold a position where the damping force is kept constant.

When the dial 23 is rotatably operated in the direction of arrow B of FIG. 2, the adjuster 17 is rotated in the direction of arrow B of FIG. 2. By this rotation, the rack 28 which meshes with the second sector gear 22 is slid in the direction of arrow X1 so that the pointer 29 integrated with the gear is moved in the same direction to thus indicate that the damping force for backlash prevention is controlled in the direction where it becomes smaller.

According to the aforementioned embodiment, one position where the dial 23 is provided to adjust the damping force for backlash prevention and the other position where the damping force is pointed out are separated from each other so that the indicia scales or divisions 32 are not covered or shaded by the fingers unlike the prior art. As a result, the indicia scales provide immediate reading to facilitate indication of adjustment of damping force with accuracy.

In this embodiment, the sector gears 21 and 22 are formed to separate one from the other so that a relationship between amount of rotation of the dial 23 and amount of movement of the rack 28 is determined as desired by varying and combining pitch diameters of the respective sector gears 21 and 22. In this instance, the sector gears 21 and 22 are separated from each other but may be formed integrally with each other.

Figure 6:
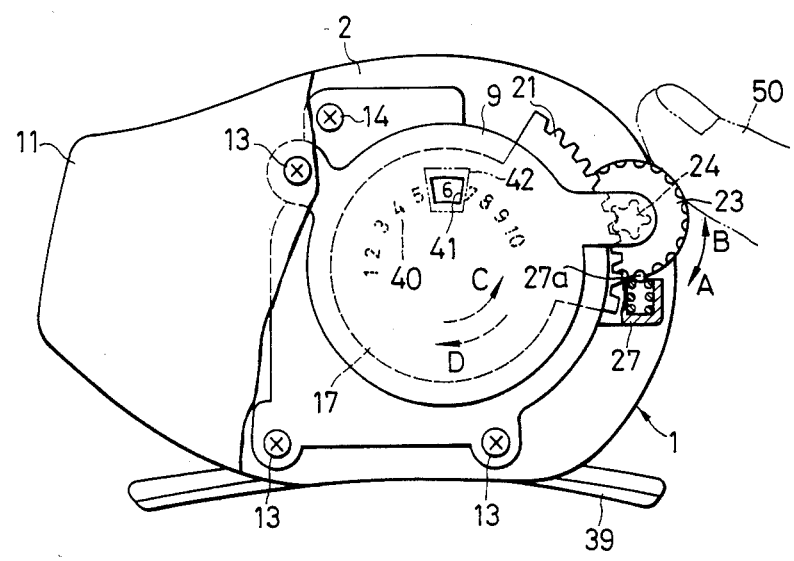
FIG. 6 is another embodiment of the fishing reel according to the invention with parts being broken away.

FIG. 6 shows another form of the indicia mechanism for damping force exerted on the fishing reel according to the invention, wherein like or similar reference numerals are used to designate the same parts shown in FIGS. 1-3, and the description is directed to what is directed to by those different from the embodiment as mentioned above. More specifically, the adjuster 17 is provided with only one first sector gear 21 engageable with the pinion 24 of the dial 23. The first sector gear 21 is formed on its surface corresponding to the holder casing 9 for the adjuster 17 with indicia numerals 40 (or symbols) indicative of the extent of damping force for the spool 5. These indicia numerals 40 are regularly spaced away from each other on the concentric circle. The holder casing 9 includes an aperture 41 in a portion thereof corresponding to one digit of the indicia numerals 40. The cover member 11 is also provided in a portion thereof corresponding to the aperture 41 with a display window 42 closed by transparent material such as acryl or the like, through which the digit may be viewed.

In this embodiment, the dial 23 is rotatably operated by a finger tip 50 in the direction of arrow A or B of FIG. 6 to impart its rotation to the gear 21 by means of the pinion 24, thereby rotating the adjuster 17 in the direction of arrow C or D of FIG. 6. Accordingly, the display window is expressive of the digit of the indicia numerals 40 depending upon amount of rotation of the adjuster 17 to be indicative of damping force for th spool 5.

Substantially the same effect as that of the previous embodiment may be obtained by this embodiment. This embodiment provides a further effect that the rack and the sector gear engageable therewith and the like are not required to thus simplify the damping force indicator mechanism, as compared with the previous embodiment.

Figure 7:
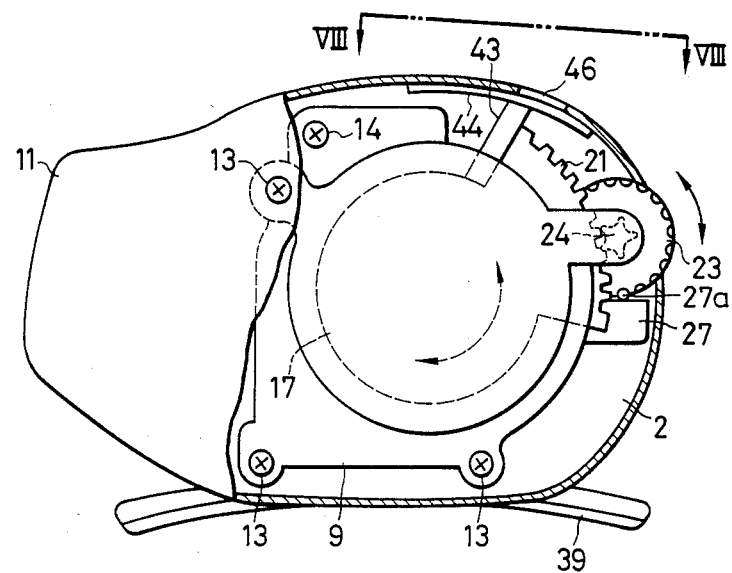
FIG. 7 is a still another embodiment of the fishing reel according to the invention with parts being broken away.
Figure 8:
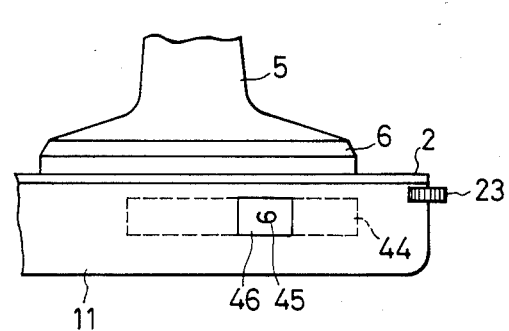
FIG. 8 is a plan view of a part of the reel taken along line VIII—VIII of FIG. 7.

FIGS. 7 and 8 illustrate still another form of the indicia mechanism for damping force exerted on the fishing reel according to the invention, wherein like or similar reference numerals are used to denote the same parts shown in FIGS. 1-3. What is different from the aforementioned embodiment is that the adjuster 17 comprises the first sector gear engageable with the pinion 24 of the dial 23, and an extension 43 formed at one end of the sector gear 21 to extend to the front of the cover member 11 peripherally thereof. The extension 43 includes at its forward end a flexible display plate 44 integrated therewith and deformably slid along the inner periphery wall of the cover member 11. The display plate 44 carries on its surface reference numerals (or symbols) 45 regularly spaced away from each other indicative of damping force. The cover member 11 with which the display plate 44 slidably contacts is provided with a display window 46 dimensioned to correspond to one digit of the numerals (or symbols).

In this embodiment, the dial 23 is rotatably operated to rotate the adjuster 17 in the direction of arrow so that the display plate 44 integrated therewith is slid along the inner peripheral wall of the cover member 11 to cause a digit of the numerals 45 formed on the display plate 44 to appear in the display window, resulting in expression of damping force upon adjustment.

Thus, substantially the same effect as that of the first embodiment may be obtained. Further, the display window 46 is formed in the front of the cover member 11 peripherally thereof to provide advantage of ready reading of the indicia when the damping force is adjusted.

The damping force indicator mechanism illustrated in the embodiments is not limited to the brake system for use with the magnet but may be applicable to the mechanical brake system. Of course, this indicator mechanism for use with the magnet brake system is not limited to those described in the embodiments. For instance, the instant indicator mechanism may be also applicable to the system in which the magnets are diametrically moved to the conductor integrated with the spool as shown in Japanese patent application Laid-Open No. 155036/83. In addition, a means for driving a damping force indicator is not limited to a combination of the dial and the sector gear. In short, various types of the indicator mechanisms may be employed if they are arranged so that the control means composed of the dial and the like and the damping force indicia are separated from each other and disposed in the respective positions, and that the indicia may readily be viewed without any influence of the finger thereon when the control means is operated for adjustment of damping force.

As precisely set forth hereinbefore, according to the invention, the adjuster of damping force applied to the spool for backlash prevention is mounted in the cover member and operated by the control means from outside, and that the damping force indicia means in association with the adjuster is provided in the cover member whereby the indicia means may be viewed through the display window by separating the former from the control means, readily viewing the readout of the indicia in adjusting the damping force without fail and interference with any operator's finger when the control means is actuated.

Also, in the embodiment shown, it should be noted that, since the dial 23 is positioned at a rear outer peripheral portion of the cover member 11 and hence, the thumb 48 of the operator's hand which is gripping the fishing rod is readily accessible to the dial 23, the dial 23 may readily be rotated by the thumb 48. Thus, the brake force adjustment prior to the casting operation may be carried out by one hand operation. Also, the operator's finger is neither tired nor injured due to such adjustment operation. Also, since the dial 23 is partially embedded in the outer flange portion of the cover member 11, upon the casting and reel take-up operations, the manual operation is not obstructed by the dial. Thus, the operability and handling operations of the reel are improved.

Figure 9:
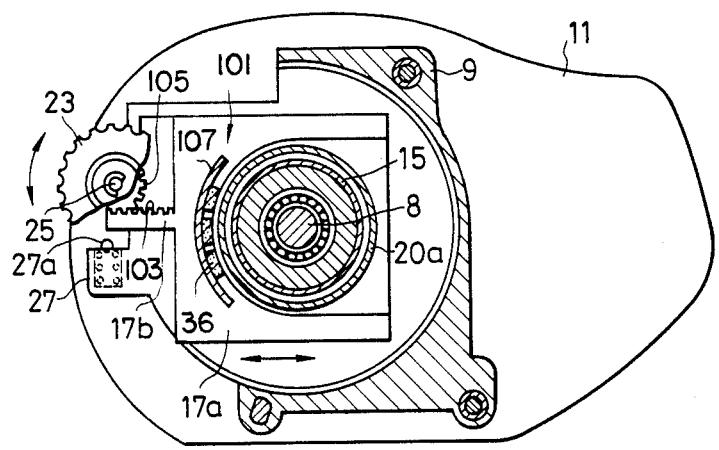
FIG. 9 is a partially sectional view showing still another embodiment of the invention.

FIG. 9 shows another embodiment of the invention. In FIG. 9, the same reference numerals or characters are used to indicate the same or like components shown in the preceding embodiments. In FIG. 9, an adjuster 101 is made of a plate in the form of a substantially U-shape. The adjuster 101 is mounted on the holder casing 9 so that the adjuster may slidingly move as indicated by two-head arrow in FIG. 9. Thus, the adjuster is movable radially with respect to a sleeve 20a of non-magnetic member toward or away from the dial 23. A plurality of magnets 36 are fixed to a bottom portion 17a of the U-shaped adjuster 101. A rack 103 engaged with the pinion 105 of the dial 23 is formed on a portion 16b, projecting toward the dial 23, of the U-shaped adjuster 101. In FIG. 9, the members 107 and 15 are made of magnetic material.

With such a structure shown in FIG. 9, as a distance between the bottom portion 17a and the sleeve 20a is increased, the braking force applied to the non-magnetic member 20a, becomes greater, and vice versa.

What is claimed is:
1. A fishing reel for containing fishing line comprising:
   a reel frame having a pair of cover members each having a front and, a rear end opposite said front end, and a rearwardly facing surface at said rear end, said fishing line adapted to be released from said front end;
   a spool rotatably mounted on said reel frame;
   brake means for braking a rotation of said spool when said spool is freely rotatable, said brake means including magnetic means for producing magnetic fields, and a non-magnetic conductor made of non-magnetic but electrically conductive material, said non-magnetic conductor being fixed to said spool and being fixed to said spool and being disposed in said magnetic field of said magnetic means;
   adjusting means movably provided in one of said pair of cover members for adjusting a damping force for said rotation of said spool;
   actuator means for actuating said adjusting means, said actuator means protruding from said rearwardly facing surface of said one of said pair of cover members, wherein said actuator means includes a rotatable dial, an edge of which protrudes beyond said rearwardly facing surface of said cover member and said edge of said dial being manually operable by a thumb of an operators hand which is gripping a fishing rod; and
   indicating means, mechanically coupled to said adjusting means to be spaced away from said dial, for indicating an amount of said damping force applied to said spool, wherein said indicating means comprises an indicia reference and a display window through which an operator can view said indicia reference, said display window being located substantially at a rear side of said one of said pair of cover members.

2. A fishing reel for containing fishing line comprising:
   a reel frame having a pair of cover members earth having a front end, a rear end opposite said front end, and a rearwardly facing surface at said rear end, said fishing line adapted to be released from said front end;
   a spool rotatably mounted on said reel frame;
   brake means for braking a rotation of said spool when said spool is freely rotatable, said brake means including magnetic means for producing magnetic fields, and a non-magnetic conductor made of non-magnetic but electrically conductive material, said non-magnetic conductor being fixed to said spool and being fixed to a said spool and being disposed in said magnetic field of said magnetic means;
   adjusting means movably provided in one of said pair of cover members for adjusting a damping force for said rotation of said spool;
   actuator means for actuating said adjusting means, said actuator means protruding from said rearwardly facing surface of said one of said pair of cover members, wherein said actuator means includes a rotatable dial, an edge of which protrudes beyond said rearwardly facing surface of said cover member and said edge of said dial being manually operable by a thumb of an operators hand which is gripping a fishing rod; and
   indicating means, mechanically coupled to said adjusting means to be spaced away from said dial, for indicating an amount of said damping force applied to said spool; said indicating means comprising a rack, an indicia scale, and a pointer coupled to said adjusting means through said rack which selectively indicates a location on said indicia scale.

* * * * *